United States Patent
Ali et al.

(10) Patent No.: US 8,016,040 B2
(45) Date of Patent: Sep. 13, 2011

(54) FLUID LOSS CONTROL

(75) Inventors: Syed Ali, Sugar Land, TX (US); Mohan K. R. Panga, Stafford, TX (US); John W. Still, Katy, TX (US); Gary John Tustin, Sawston (GB); Balkrishna Gadiyar, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/323,606

(22) Filed: Nov. 26, 2008

(65) Prior Publication Data

US 2010/0126723 A1 May 27, 2010

(51) Int. Cl.
*E21B 43/22* (2006.01)
*E21B 43/27* (2006.01)
*E21B 43/28* (2006.01)

(52) U.S. Cl. ........ 166/281; 166/276; 166/278; 166/292; 166/304; 166/311

(58) Field of Classification Search .................. None
See application file for complete search history.

(56) References Cited

U.S. PATENT DOCUMENTS

| | | |
|---|---|---|
| 3,353,600 A | 11/1967 | Annis et al. |
| 3,692,676 A | 9/1972 | Culter et al. |
| 3,960,736 A | 6/1976 | Free et al. |
| 4,387,769 A | 6/1983 | Erbstoesser et al. |
| 4,526,695 A | 7/1985 | Erbstoesser et al. |
| 4,585,482 A | 4/1986 | Tice et al. |
| 4,621,692 A | 11/1986 | Mondshine |
| 4,715,967 A | 12/1987 | Bellis et al. |
| 4,848,467 A | 7/1989 | Cantu et al. |
| 4,957,165 A | 9/1990 | Cantu et al. |
| 4,961,466 A | 10/1990 | Himes et al. |
| 4,986,354 A | 1/1991 | Cantu et al. |
| 4,986,355 A | 1/1991 | Casad et al. |
| 5,165,477 A | 11/1992 | Shell et al. |
| 5,247,995 A | 9/1993 | Tjon-Joe-Pin et al. |
| 5,325,921 A | 7/1994 | Johnson et al. |
| 5,439,057 A | 8/1995 | Weaver et al. |

(Continued)

FOREIGN PATENT DOCUMENTS

EP 404489 3/1995

(Continued)

OTHER PUBLICATIONS

Arauja, A. et al.; Field Use of Temporary Fluid-Loss Control Pill During Deepwater Completions in High-Permeability Formations ; SPE 53924 (1999).

(Continued)

*Primary Examiner* — Zakiya W. Bates
(74) *Attorney, Agent, or Firm* — David G. Matthews; Rodney V. Warfford (57) ABSTRACT

A fluid loss control method uses a fluid loss control pill in a well in advance of a completion operation. An embodiment of the fluid loss control pill comprises polyester solids that are hydrolysable and can exhibit plastic deformation at formation conditions. An embodiment of the method comprises spotting the fluid loss control pill in the well adjacent to a formation to form a filtercake to inhibit fluid entry from the well into the formation, performing a completion operation comprising contacting the filtercake with overbalanced wellbore fluid, and degrading the filtercake wherein the polyester particles are hydrolyzed to remove formation damage.

27 Claims, 6 Drawing Sheets

U.S. PATENT DOCUMENTS

| | | | |
|---|---|---|---|
| 5,551,516 | A | 9/1996 | Norman et al. |
| 5,566,759 | A | 10/1996 | Tjon-Joe-Pin et al. |
| 5,678,632 | A | 10/1997 | Moses et al. |
| 5,680,900 | A | 10/1997 | Nguyen et al. |
| 5,881,813 | A | 3/1999 | Brannon et al. |
| 5,964,295 | A | 10/1999 | Brown et al. |
| 5,979,557 | A | 11/1999 | Card et al. |
| 6,110,875 | A | 8/2000 | Tjon-Joe-Pin et al. |
| 6,140,277 | A | 10/2000 | Tibbles et al. |
| 6,258,859 | B1 | 7/2001 | Dahayanake et al. |
| 6,263,967 | B1 | 7/2001 | Morris et al. |
| 6,394,185 | B1 | 5/2002 | Constien |
| 6,432,885 | B1 | 8/2002 | Vollmer |
| 6,435,277 | B1 | 8/2002 | Qu et al. |
| 6,509,301 | B1 | 1/2003 | Vollmer |
| 6,534,449 | B1 | 3/2003 | Gilmour et al. |
| 6,569,814 | B1 | 5/2003 | Brady et al. |
| 6,599,863 | B1 | 7/2003 | Palmer et al. |
| 6,631,764 | B2 | 10/2003 | Parlar et al. |
| 6,638,896 | B1 | 10/2003 | Tibbles et al. |
| 6,645,769 | B2 | 11/2003 | Tayebi et al. |
| 6,763,888 | B1 | 7/2004 | Harris et al. |
| 6,817,414 | B2 | 11/2004 | Lee |
| 6,831,044 | B2 | 12/2004 | Constien |
| 6,883,608 | B2 | 4/2005 | Parlar et al. |
| 6,978,838 | B2 | 12/2005 | Parlar et al. |
| 7,060,661 | B2 | 6/2006 | Dobson, Sr. et al. |
| 7,084,095 | B2 | 8/2006 | Lee et al. |
| 7,166,560 | B2 | 1/2007 | Still et al. |
| 7,265,079 | B2 | 9/2007 | Willberg et al. |
| 7,276,466 | B2 | 10/2007 | Todd et al. |
| 7,303,018 | B2 | 12/2007 | Cawiezel et al. |
| 7,482,311 | B2 | 1/2009 | Willberg et al. |
| 7,553,800 | B2 | 6/2009 | Munoz, Jr. |
| 2002/0142919 | A1 | 10/2002 | Constien |
| 2004/0014606 | A1 | 1/2004 | Parlar et al. |
| 2004/0106525 | A1 | 6/2004 | Willberg et al. |
| 2004/0209780 | A1 | 10/2004 | Harris et al. |
| 2005/0034865 | A1 | 2/2005 | Todd et al. |
| 2005/0056423 | A1 | 3/2005 | Todd et al. |
| 2005/0137095 | A1 | 6/2005 | Cawiezel et al. |
| 2005/0139354 | A1 | 6/2005 | Salamat |
| 2005/0161220 | A1 | 7/2005 | Todd et al. |
| 2005/0252659 | A1 | 11/2005 | Sullivan et al. |
| 2006/0042797 | A1 | 3/2006 | Fredd et al. |
| 2006/0157248 | A1 | 7/2006 | Hoefer et al. |
| 2006/0185848 | A1 | 8/2006 | Surjaatmadja et al. |
| 2006/0229212 | A1 | 10/2006 | Willberg et al. |
| 2007/0238623 | A1* | 10/2007 | Saini et al. ............ 507/219 |
| 2008/0139416 | A1* | 6/2008 | Rimassa et al. ........ 507/241 |

FOREIGN PATENT DOCUMENTS

| | | |
|---|---|---|
| WO | 03023177 | 3/2003 |
| WO | 2004007905 | 1/2004 |
| WO | 2005095755 | 10/2005 |
| WO | 2007066254 A2 | 6/2007 |
| WO | 2007088322 | 8/2007 |
| WO | 2008072128 | 6/2008 |

OTHER PUBLICATIONS

Blauch, M. E., et al.; Fluid-Loss Control Using Crosslinkable HEC in High-Permeability Offshore Flexure Trend Completions; SPE 19752 (1989).

Chang, F.F. et al.; Development of a New Crosslinked-HEC Fluid Loss Control Pill for Highly-Overbalance, High-Permeability and/or High Temperature Formations; SPE 39438 (1998).

Cole, R. Clay et al.; A New Environmentally Safe Crosslinked Polymer for Fluid-Loss Control; SPE 29525 (1995).

Hodge, R.M. et al.; The Selection and Application of Loss Control Materials to Minimize Formation Damage in Gravel Packed Completions for a North Sea Field; SPE 30119 (1995).

Kippie, David P. et al.; Chemical Fluid-Loss-Control Systems for Severe Environments: Taking Conventional Systems to a Higher Level; SPE 73771 (2002).

Lamb, Keith F. et al; Fluid Loss Pills Control Losses through Sand Control Screens without Damage or Cleanup; SPE 110692 (2007).

Luyster, M.R. et al.; Development of a Novel Fluid-Loss Control Pill for Placement Inside Gravel-Pack Screens; SPE 58734 (2000).

Nguyen, Philip D. et al.; Development and Field Application of a New Fluid-Loss Control Material; SPE 36676 (1996).

Parlar, M. et al.; Guidelines for Selection of Fluid Loss Control Methods Before and After Sand Control Treatments to Maximize Well Productivity and Cost-Effectiveness; SPE 39460 (1998).

Ross, Colby M. et al.; Current Materials and Devices for Control of Fluid Loss; SPE 54323 (1999).

Vollmer, D.P. et al.; Brine and Permeability Effects on Crosslinked Fluid-Loss Pill Filter-Cake Formation; SPE 93319 (2005).

U.S. Appl. No. 11/609,367 Office Action dated Oct. 25, 2010.

* cited by examiner

FLUID LOSS CONTROL

FIELD OF THE INVENTION

The invention, in an embodiment, relates to fluid loss control in the completion of oil and gas wells.

BACKGROUND OF THE INVENTION

Loss of well completion fluids to the formation can cause formation damage, i.e., a reduction in permeability and conductivity near the wellbore, and thereby reduce the production of hydrocarbons. For example, fluid leakoff into the formation can occur during gravel placement and/or screen installation due to overbalance pressure, i.e., the difference in hydraulic head and reservoir pressure. After perforating, as another example, the completion fluid also tends to leak into the formation. The completion fluid can also be lost during the trip out and trip in to assemble the production tubing and the screen after the well is gravel packed. Generally, a flapper valve is used to isolate the screen and the formation from the wellbore fluids after the service tool and wash pipe are pulled out of the screen. If the flapper valve fails to isolate, the brine can be lost to the formation.

Completion fluids are often made of, for example, a high density brine. As used herein, a high density brine, sometimes also called a heavy brine or high brine, refers to an aqueous inorganic salt solution having a specific gravity of greater than about 1.02 kg/L (8.5 lb/gal (ppg)), 1.08 kg/L (9 ppg) or 1.14 kg/L (9.5 ppg), especially above 1.2, 1.32, 1.44 or 1.5 kg/L (10, 11, 12 or 12.5 ppg), or up to 1.8 kg/L (15 ppg). The loss of high density brine is undesirable not only because of the cost of the brine, but also because of the damage it can cause to the formation permeability. For example, calcium and zinc bromides, which are used in some high density brines, can form stable, acid insoluble compounds when contacted with brines occurring in the formation. In addition, unloading these dense brines from the formation is not an easy task. See SPE 29525 (1995).

To control the fluid leak-off to the formation a fluid loss control pill has been used to block the perforations or to form a filtercake on the formation face. In the case of fluid loss through the screen during trip out for assembling the screen and the production tubular, the fluid loss pill is spotted inside the screen to block the openings in the screen. Typically, crosslinked hydroxyethyl cellulose (HEC) with sized calcium carbonate, rock salt or oil soluble resins is used as a loss control pill. See SPE 19752 (1989); SPE 30119 (1995); SPE 36676 (1996); SPE 39438 (1998); SPE 53924 (1999); SPE 58734 (2000); SPE 73771 (2002); and SPE 93319 (2005). A high concentration of the polymer, e.g., 9.6-14.4 g/L (80-120 pounds per thousand gallons (ppt)), is used to reduce leak-off to high permeability formations and also to contain the depth of invasion of polymer into the formation. A typical completion process using crosslinked HEC with salt solids is described in SPE 30119.

To initiate production following placement of the HEC/particulate fluid loss control pill, the filtercake of crosslinked HEC and the particulates must be removed from the perforations, the formation face, the screen, and so forth. Thus, acid and breakers are circulated prior to gravel packing, to break the polymer and dissolve the solids used in the pill. However, the cleanup is not uniform in these treatments due to several reasons including channeling of the treatment fluid into the first few perforations, incomplete removal of bridging agents, blockage of screen openings with bridging agent, insufficient cleanup of polymer from the filtercake and the formation, reduction in gravel pack permeability due to trapped debris from the fluid loss pill, and so on. See SPE 30119.

The cleanup difficulties are especially severe when the filtercake is sandwiched between the formation face and the gravel pack, e.g., when the HEC/particulate is applied in advance of gravel packing. The polymer tends to hold the calcium carbonate particles together and it is extremely difficult to initiate flow back from the formation to lift off the filtercake into the gravel pack. For this reason, calcium carbonate/polymer systems are used primarily to bridge against screens, and the size distribution of commercially available calcium carbonate particles has been carefully selected to successfully bridge with minimal particle invasion.

In addition, mixing the fluid loss control and clean up pills at the wellsite can require on-site quality control and expertise. For example, the HEC must be crosslinked prior to placement at the formation since crosslinking within the formation may lead to additional damage from polymer that cannot be easily broken.

In the stimulation of formations generally by hydraulic fracturing, it is also known to use a fluid loss additive (FLA) in carrier fluids with viscosifiers such as polymers to inhibit excessive fluid loss from the carrier fluid into the fracture face, for example. The FLA helps form a filtercake on the surface of the fracture, reducing permeability at the fluid-rock interface and improving fracturing efficiency. Conventional FLA usually consists of fine particles, such as mica or silica flour with a broad distribution of particle sizes designed to effectively plug the pore throats of the rock matrix. Starches or other polymers can be added to help fill in the spaces and further reduce the flow.

U.S. Pat. No. 3,960,736 discusses the use of esters to offer a delayed acid which will break a fracturing fluid used to carry proppant into a hydraulic fracture by attacking the polymer and borate crosslinks. Similarly, acid generation mechanisms are employed in U.S. Pat. No. 4,387,769 and U.S. Pat. No. 4,526,695.

The use of a hydrolysable polyester material as an FLA for fluid loss control in fracturing systems has also previously been proposed; further, degradation products of such materials have been shown to cause delayed breaking of fracturing fluids. U.S. Pat. No. 4,715,967 discloses the use of polyglycolic acid (PGA) as a fluid loss additive to temporarily reduce the permeability of a formation. SPE 18211 discloses the use of PGA as a fluid loss additive and gel breaker for crosslinked hydroxypropyl guar fluids. U.S. Pat. No. 6,509,301 describes the use of acid forming compounds such as PGA as delayed breakers of surfactant-based vesicle fluids, such as those formed from the zwitterionic material lecithin.

Encapsulated breakers based on oxidants and/or enzymes are also well known in fracturing systems. Typically, in the prior art the encapsulated breakers are injected with the proppant in the carrier fluid. The breaker capsules are generally the same size as the proppant particles, to facilitate distribution in the proppant pack and promote breakage when the fracture is closed to release the breaker to react with the viscosifier and reduce the viscosity of the carrier fluid to restore permeability to the proppant pack.

Other references that may be pertinent to the present invention include U.S. Pat. No. 6,394,185; U.S. Pat. No. 6,342,467; U.S. Pat. No. 5,333,689; SPE 58734; SPE 36676; SPE 19752; SPE 93319; SPE 53924; SPE 29525; SPE 73771; SPE 39438; and SPE 30119.

To the extent they are not inconsistent with present disclosure, each of the references mentioned herein are hereby incorporated herein by reference in their entirety for the purpose of US patent practice and other jurisdictions where permitted.

SUMMARY OF THE INVENTION

According to an embodiment of the present invention, a well completion method uses a fluid loss control pill (FLCP) comprising degradable polyester particles, with or without a thickening polymer, to control leak off to the formation. In an embodiment, the particles are sized in a particular distribution, e.g., a graded particle size distribution, to form a filtercake on the formation or the screen. In embodiments, the filtercake can be internal, external or a combination thereof, with respect to the screen. In an embodiment, a plurality of differently shaped particles, such as, for example, powders, fibers, films, flakes, beads and the like, can be used to obtain effective fluid loss control. In an embodiment, the polyester particles can deform at downhole temperatures to facilitate an efficient seal on the formation face or the screen.

In one embodiment, the presence of water and heat can slowly hydrolyze the particles to release acid. In an embodiment, the released acid can facilitate breaking any polymer, where used in the pill, and removing any formation damage. Following hydrolysis, in an embodiment, the polyester component of the filtercake is completely liquefied at the formation or screen face, thereby avoiding the clean up issues associated with conventional fluid loss control pills.

DETAILED DESCRIPTION OF EMBODIMENTS OF THE INVENTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors have disclosed and enabled the entire range and all points within the range.

In one embodiment, a method comprises spotting a fluid loss control pill (FLCP) in a well adjacent to a formation to form a filtercake to inhibit fluid entry from the well into the formation, performing a completion operation for the well comprising contacting the filtercake with overbalanced wellbore fluid, and degrading the filtercake. In an embodiment, the filtercake can be made up of, for example, polyester particles that can be plastically deformable, hydrolyzable or a combination thereof. In an embodiment, the polyester particles are hydrolyzed, e.g., to remove formation damage.

In embodiments, the FLCP can further comprise less than 10 g/L (80 pounds per 1000 gallons of fluid (ppt)) hydratable polymer; less than 9 g/L (75 ppt) hydratable polymer; less than 6 g/L (50 ppt) hydratable polymer; less than 4.8 g/L (40 ppt) hydratable polymer; less than 3.6 g/L (30 ppt) hydratable polymer; or less than 3 g/L (25 ppt) polymer. In an embodiment, the FLCP comprises from about 1.2 to about 6 g/L (10 to 50 ppt) hydratable polymer. In an alternate embodiment, the FLCP is free of thickening polymer and has a low viscosity.

In an embodiment, the FLCP can include a crosslinking agent for the hydratable polymer. In an embodiment where the thickening polymer is susceptible to acid breaking, the hydrolysis of the polyester can release acid to break the polymer. In an embodiment, the FLCP further comprises borate crosslinked polymer.

In an embodiment, the FLCP further comprises dissolvable particles mixed with the polyester particles. In an embodiment, the dissolvable particles can comprise acid soluble particles and the hydrolysis of the polyester can release acid to facilitate dissolving the acid soluble particles. In an embodiment, the FLCP further comprises calcium carbonate particles.

In embodiments, the polyester can be selected from the group consisting of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

In an embodiment, the FLCP comprises particles having a mean diameter greater than 15 microns. In an embodiment, the FLCP comprises particles having a plurality of size gradings. Alternatively or additionally, the FLCP can comprise particles having a plurality of shape types selected from beads, powders, spheres, ribbons, platelets, fibers, flakes, and so on, and combinations thereof. In embodiments, the FLCP comprises particles having an aspect ratio greater than 1, greater than 10, greater than 100, greater than 200, or greater than 250. As used herein, the term "aspect ratio" refers to the ratio of the longest and shortest axes of a particle.

The method in one embodiment is applied to a formation that is suitable for gravel packing, such as unconsolidated sand, for example, a formation having a compressive strength less than about 6.9 MPa (1000 psi). In an embodiment, the formation has a permeability greater than about 10 mD, or greater than about 50 mD.

In embodiments, the completion operation can include cleanout, gravel packing, or the like, or a combination thereof. In an embodiment, the filtercake can plug a perforation tunnel, e.g., in a cased-hole completion, until cleanout. Because the polyester particles can degrade spontaneously after a certain period of time at the downhole conditions, the method can effectively remove the filtercake from the perforations to facilitate proper gravel placement in the perforation tunnels.

In another embodiment, the filtercake can be formed on a screen after gravel packing. For example, the FLCP can comprise particles having a mean diameter greater than one-sixth the width of openings in the screen. In an embodiment where the completion operation comprises using a valve to isolate the formation from the wellbore fluid, the filter cake on the screen can inhibit fluid loss in the event of valve failure. In an alternate or additional embodiment, the completion operation can include pulling a wash pipe or service tool from adjacent the screen, assembling production tubing to the screen, a combination thereof or the like.

In another embodiment, regardless of whether the filter cake is internal or external, the completion operation can include tripping a tool string in or out of the well.

In an embodiment, the polyester bridging agent can decompose spontaneously at the downhole temperature and aqueous environment into soluble hydrolysis products, facilitating filtercake removal even without a distinct flushing step. In an embodiment, the method can include backflow flushing of filtercake residue wherein flushing fluid consists essentially of reservoir fluid produced in situ from the formation after the filtercake is formed. In another embodiment, reservoir fluid can be produced directly from the formation without intermediate recirculation of a flushing fluid in the well to remove filtercake residue.

Fluid loss control pills are used in an embodiment to control leak-off of completion brine after perforating and before gravel packing or frac-packing. They are also used in an additional or alternate embodiment to isolate the completion and wellbore fluid after gravel packing by spotting the pill inside the screen. These pills in an embodiment can contain a polyester bridging agent, optionally with or without a viscosifying polymer.

The bridging agents in embodiments are particles sized such that they block the openings in the screen, or the pores of the formation. In an embodiment, the polyesters can hydrolyze in the presence of water and heat occurring at downhole conditions to release acid. In an embodiment where the polymer used in the pill, the acid can break the polymer. Because the acid can be generated locally in all the perforations in an embodiment, a uniform removal of filtercake can be achieved. In an embodiment, a separate or additional treatment step is not required for removal of filtercake because the cake is self destructive. In an embodiment, the particles can be essentially inert at surface conditions and easily added to the completion brine or any polymer system. Thus, an extensive quality control program is not required to mix the pill on location.

Examples of degradable polyester materials that may be used in embodiments of the FLCP can include but are not limited to lactide, glycolide, polylactic acid, polyglycolic acid, a copolymer of polylactic acid and polyglycolic acid, a copolymer of glycolic acid with other hydroxyl-, carboxylic acid-, or hydroxycarboxylic acid-containing moieties, a copolymer of lactic acid with other hydroxy-, carboxylic acid or hydroxycarboxylic acid-containing moieties, or mixtures of the preceding. Further examples of degradable materials include those described in the publication of Advances in Polymer Science, vol. 157, "Degradable Aliphatic Polyesters," edited by A. C. Albertson (2001). Specific examples include homopolymers, random, block, graft, and star- and hyper-branched aliphatic polyesters. Polyesters can be prepared by, for example, polycondensation reactions, ring-opening polymerizations, free radical polymerizations, coordinative ring-opening polymerizations, and any other suitable process. Specific examples of suitable polymers include aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); polyphosphazenes, and the like.

In an embodiment, the polyester material can be selected to soften at the downhole conditions to facilitate sealing of the screen openings or pore throats in the gravel pack or formation face, by plastic deformation which is also known as plastic flow. A material that is liable to plastic deformation remains rigid under stresses of less than a certain intensity but behaves approximately as a Newtonian fluid under severer stresses, such as may be exerted by overbalance pressure from the wellbore fluid, and exhibits permanent deformation when the stress is relaxed.

In an embodiment the polyester material degrades after temporarily sealing for fluid loss during the treatment operation, and helps restore permeability and conductivity for reservoir fluid production. The delayed degradation of polyester generally includes hydrolysis of the ester moieties at downhole conditions of elevated temperature and an aqueous environment into hydrolysis such as carboxylic acid and hydroxyl moieties, for example. The hydrolysis in one embodiment can render the polyester filtercake degradation products entirely soluble in the downhole and/or reservoir fluids. In an alternative or additional embodiment, the entire filtercake need not be entirely soluble following polyester degradation; it is sufficient only that enough hydrolysis occurs so as to allow the residue of the degraded or partially degraded filter cake to be lifted off of the sealed surface by a low backflow pressure from produced reservoir fluids.

The above mentioned degradable materials in one embodiment are comprised solely of polyester particles, e.g., the pill can be free or essentially free of non-polyester solids. In another embodiment, the polyester can be mixed or blended with other degradable or dissolvable solids, for example, solids that react with the hydrolysis products, such as magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass, for the purpose of increasing the rate of dissolution and hydrolysis of the degradable material, or for the purpose of providing a supplemental bridging agent that is dissolved by the hydrolysis products. Moreover, examples of reactive solids that can be mixed include ground quartz (or silica flour), oil soluble resins, degradable rock salts, clays such as kaolinite, illite, chlorite, bentonite, or montmorillonite, zeolites such as chabazite, clinoptilolite, heulandite, or any synthetically available zeolite, or mixtures thereof. Degradable materials can also include waxes, oil soluble resins, and other materials that degrade or become soluble when contacted with hydrocarbons.

In embodiments of the invention, the particles of hydrolyzable material, optionally mixed with solid acid-reactive materials in the same or separate particles, are in the form of beads, powder, spheres, ribbons, platelets, fibers, flakes, or any other shape with an aspect ratio equal to or greater than one. In embodiments, the solids include particles having an aspect ratio greater than 10, greater than 100, greater than 200, greater than 250 or the like, such as platelets or fibers or the like. The blended materials can take any form of composites, for example biodegradable material coatings or scaffolds with other materials dispersed therein. Further, the degradable particles can be nano-, micro-, or mesoporous structures that are fractal or non-fractal.

Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations from about 1 to about 15 grams per liter of the liquid phase of the fluid, more particularly, the concentration of fibers may be from about 2 to about 12 grams per liter of liquid, and more particularly, from about 2 to about 10 grams per liter of liquid.

In some aspects, the FLCP comprises a brine carrier having a density of at least 1.02 kg/L (8.5 ppg (8.5 pounds per gallon)), but may be as low as 1 kg/L (8.3 ppg). As used herein, a heavy brine, sometimes also called a high density brine or high brine, is an aqueous inorganic salt solution having a specific gravity of greater than about 1.02 kg/L (8.5 lb/gal (ppg)), 1.08 kg/L (9 ppg) or 1.14 kg/L (9.5 ppg), especially above 1.2, 1.32, 1.44 or 1.5 kg/L (10, 11, 12 or 12.5 ppg), or up to 1.8 kg/L (15 ppg). Available water, other than brine, may also be used in some embodiments as the carrier for the FLCP.

When used, the brine is water comprising an inorganic salt or organic salt. Embodiments of inorganic monovalent salts include alkali metal halides, more preferably sodium, potassium or cesium bromide. Embodiments of inorganic divalent salts include calcium halides, for example, calcium chloride or calcium bromide. Zinc halides, especially zinc bromide, may also be used. Inorganic salt can be added to the carrier fluid in any hydration state (e.g., anhydrous, monohydrated, dihydrated, etc.). The carrier brine phase may also comprise an organic salt, in embodiments sodium or potassium formate, acetate or the like, which may be added to the treatment fluid up to a concentration at which phase separation might occur, approximately 1.14 kg/L (9.5 ppg). In an embodiment, mixture of organic and inorganic salts can achieve a density higher than about 1.2 kg/L (10 ppg).

The salt in one embodiment of the FLCP is compatible with the drilling fluid which was used to drill the wellbore, or in a completion/clean up fluid, e.g., the salt in the FLCP can be the same as the salt used in the drilling fluid and/or other completion fluids. In embodiments where hydroxyethylaminocarboxylic acids are used for wellbore clean up, for example, the FLCP brine can consist essentially of monovalent salts, avoiding divalent salts might form chelates or other complexes and thus make less of the hydroxyethylaminocarboxylic acid available for clean up. In an embodiment, where a zwitterionic surfactant is employed, the electrolyte should also be compatible with the brine, for example, a density up to 1.2 kg/L (10 ppg) where the brine phase of other completion or reservoir drilling fluids comprises potassium formate, sodium acetate or the like at up to about 24 wt % (1.14 kg/L (9.5 ppg)). In an embodiment, the electrolyte in the treatment fluid may be used in an amount of from about 0.01 wt % to about 30.0 wt % of the total liquid phase weight.

The FLCP can be prepared with or without a thickening agent such as a polymer or viscoelastic surfactant fluid system (VES). In an embodiment, the degradable polyester particles can have a specific gravity that is similar to an aqueous carrier fluid such as fresh water or brine so that a high viscosity or other rheological modifications are not necessary to maintain dispersion of the bridging agent in the carrier fluid. Thus, where a polymer-free filtercake is desired the FLCP can be essentially free of polymer, i.e. slickwater. If a polymer is used to generate viscosity in the FLCP, only a minimal fluid viscosity can be sufficient to prevent undue settling of the bridging agent during preparation and placement of the pill within the wellbore. Since the present invention can allow better sealing by the bridging agent in the filtercake, a lower concentration of polymer can be utilized to facilitate a primary goal of avoiding formation damage.

Embodiments of polymer concentrations, when present, can vary with temperature, fluid system, formation depth and bridging agent properties and loading, screen size, permeability, gravel size, and the like, but non-limiting exemplary ranges can include 0.12 to 9.6 g/L (1 to 80 lb of polymer per 1000 gallons), or 1.2 to 4.8 g/L (10 to 40 lb of polymer per 1000 gallons). In embodiments, polymers can include galactomannans such as guar, derivatized guars such as hydroxypropyl guar, carboxymethyl guar, carboxymethylhydroxypropyl guar, hydrophobically modified galactomannans, xanthan gum, hydroxyethylcellulose, and polymers, copolymers and terpolymers containing acrylamide monomer, and the like.

Some non-limiting examples of suitable polymers include: polysaccharides, such as, for example, guar gums, high-molecular weight polysaccharides composed of mannose and galactose sugars, including guar derivatives such as hydroxypropyl guar (HPG), carboxymethyl guar (CMG), and carboxymethylhydroxypropyl guar (CMHPG), and other polysaccharides such as xanthan, diutan, and scleroglucan; cellulose derivatives such as hydroxyethyl cellulose (HEC), hydroxypropyl cellulose (HPC), carboxymethylhydroxypropyl cellulose (CMHEC), and the like; synthetic polymers such as, but not limited to, acrylic and methacrylic acid, ester and amide polymers and copolymers, polyalkylene oxides such as polymers and copolymers of ethylene glycol, propylene glycol or oxide, and the like. The polymers are preferably water soluble. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described published application US 2004209780.

As used herein, when a polymer is referred to as comprising a monomer or comonomer, the monomer is present in the polymer in the polymerized form of the monomer or in the derivative form of the monomer. However, for ease of reference the phrase comprising the (respective) monomer or the like may be used as shorthand.

In some cases, the polymer or polymers are formed of a linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2/C_3$, $C_3/C_4$, or $C_2/C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{24}$-alkyl-substituted hydroxyalkyl galactomannans, e.g., wherein the amount of alkyl substituent groups is preferably about 2 percent by weight or less by weight of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans in one embodiment comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-$C_1$-$C_4$-alkyl guars, such descriptions apply equally to other galactomannans, as well.

The polymers can optionally be crosslinked with polyvalent cations such as borate or metal ions, for example, zirconium or titanium including complexed metals, and so on. While linear (non-crosslinked) polymer systems can be used in an embodiment, they generally require higher polymer levels for the same rheological modification. In some embodiments, the fluids used may further include a crosslinker. Adding crosslinkers to the fluid may further augment the viscosity of the fluid. Crosslinking consists of the attachment of two polymeric chains through the chemical association of such chains to a common element or chemical group.

Suitable polymer crosslinkers may comprise a chemical compound containing a polyvalent ion such as, but not necessarily limited to, boron or a metal such as chromium, iron, aluminum, titanium, antimony and zirconium, or mixtures of polyvalent ions. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include by non-limiting example, those crosslinked by zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid.

A viscoelastic surfactant fluid system (VES) in an embodiment of the FLCP can include cationic, amphoteric, anionic, nonionic, mixed, and zwitterionic viscoelastic surfactant fluid systems. Non-limiting examples include those described in U.S. Pat. Nos. 5,551,516; 5,964,295; 5,979,555; 5,979,557; 6,140,277; 6,258,859 and 6,509,301, all hereby incorporated by reference. In general, suitable zwitterionic surfactants have the formula:

$$RCONH—(CH_2)_a(CH_2CH_2O)_m(CH_2)_b—N^+(CH_3)_2—(CH_2)_{a'}(CH_2CH_2O)_{m'}(CH_2)_{b'}COO^-$$

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and —$CH_2CH_2O$— may also be oriented as —$OCH_2CH_2$—. In an embodiment, the surfactants are betaines.

Two examples of commercially available betaine concentrates are, respectively, BET-O-30 and BET-E-40. The VES surfactant in BET-O-30 is oleylamidopropyl betaine. It is designated BET-O-30 because as obtained from the supplier (Rhodia, Inc. Cranbury, N.J., U.S.A.) it is called Mirataine BET-O-30; it contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material, BET-E-40, contains erucylamidopropyl betaine. BET surfactants, and others that are suitable, are described in U.S. Pat. No. 6,258,859. Certain co-surfactants may be useful in extending the brine tolerance, to increase the gel strength, and to reduce the shear sensitivity of VES fluids, in particular for BET-O-type surfactants. An example given in U.S. Pat. No. 6,258,859 is sodium dodecylbenzene sulfonate (SDBS). VES's may be used with or without this type of co-surfactant, for example those having a SDBS-like structure having a saturated or unsaturated, branched or straight-chained $C_6$ to $C_{16}$ chain; further examples of this type of co-surfactant are those having a saturated or unsaturated, branched or straight-chained $C_8$ to $C_{16}$ chain. Other suitable examples of this type of co-surfactant, especially for BET-O-30, are certain chelating agents such as trisodium hydroxyethylethylenediamine triacetate.

Exemplary cationic viscoelastic surfactants include the amine salts and quaternary amine salts disclosed in commonly assigned U.S. Pat. Nos. 5,979,557, and 6,435,277 which are hereby incorporated by reference.

Examples of suitable cationic viscoelastic surfactants include cationic surfactants having the structure:

$$R_1N^+(R_2)(R_3)(R_4)X^-$$

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines, in which $R_1$, $R_2$, and $R_3$ in the cationic surfactant and in the amine have the same structure. As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, copolymers, and mixtures of these members. They may also contain performance enhancers, such as viscosity enhancers, for example polysulfonates, polysulfonic acids or the like, as described in U.S. Pat. No. 7,084,095 which is hereby incorporated by reference.

Another embodiment of a cationic VES is erucyl bis(2-hydroxyethyl) methyl ammonium chloride, also known as (Z)-13 docosenyl-N—N-bis(2-hydroxyethyl) methyl ammonium chloride. It is commonly obtained from manufacturers as a mixture containing about 60 weight percent surfactant in a mixture of isopropanol, ethylene glycol, and water. Other embodiments of amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride; and the like.

Amphoteric viscoelastic surfactants comprise another embodiment. Exemplary amphoteric viscoelastic surfactant systems include those described in U.S. Pat. No. 6,703,352, for example amine oxides. Other exemplary viscoelastic surfactant systems include those described in U.S. Pat. Nos. 7,060,661, 7,303,018, and 2005-0137095, for example amidoamine oxides. These four references are hereby incorporated in their entirety. Mixtures of zwitterionic surfactants and amphoteric surfactants comprise an embodiment. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

Friction reducers may also be incorporated into fluids used in the invention. Any friction reducer may be used, e.g. hydoxyethyl cellulose (HEC), xanthan, 2-acrylamido-2-methylpropanesulfonic acid (AMPS), sphingans such as diutan and the like. Also, polymers such as polyacrylamide, polyisobutyl methacrylate, polymethyl methacrylate and polyisobutylene as well as water-soluble friction reducers such as guar gum, guar gum derivatives, hydrolyzed polyacrylamide, and polyethylene oxide may be used. Commercial drag reducing chemicals such as those sold by Conoco Inc. under the trademark CDR as described in U.S. Pat. No. 3,692,676

(Culter et al.) or drag reducers such as those sold by Chemlink designated under the trademarks FLO 1003, 1004, 1005 & 1008 have also been found to be effective. These polymeric species added as friction reducers or viscosity index improvers may also act as fluid loss additives reducing or even eliminating the need for conventional fluid loss additives.

This invention also provides a method in a gravel packing system where, after the treatment and fluid loss control is no longer needed or desirable, a high breaker loading is provided within the filtercake where any polymer viscosifier is concentrated. In effect, the bridging agent hydrolyzes in an embodiment to soluble hydrolysis products such as acid and thus becomes the breaker. In an embodiment, a single additive can serve as both the bridging agent and breaker, i.e. as the only bridging agent and as the only breaker. When activated after an appropriate delay to allow the relevant completion operations to be completed, the breaker reduces the viscosity and yield stress where the filter cake residue dissolves and mixes with reservoir fluids, and can thus lead to enhanced clean-up. Additional breaker or encapsulated breaker can optionally be added in an embodiment.

In embodiments, the polyester bridging agent can have a particle size distribution to effectively seal the gravel packing screen, perforation tunnels and/or formation as needed to be an effective temporary fluid loss control for the formation. In embodiments, the bridging particulates have a size less than 100 mesh (150 microns), between 150 and 325 mesh (about 40 to 100 microns), or less than 325 mesh (about 40 microns). In general, larger particle sizes are used to treat screens, very high permeability formations and formations with natural fissures, whereas smaller sizes are used with lower permeability formations. In one embodiment, a mixture of particles of different sizes, for example a bimodal distribution, can be used.

The particles in the FLCP may be used in conjunction with other materials that aid in controlling fluid loss, such as silica flour, mica, or polymers such as starch or guars, provided either that the additional material is at least partially degraded after closure, or is present in a sufficiently small amount that it does not seriously detract from the efficacy of the treatment. The filtercake need not be entirely broken; it is sufficient only that enough breaking occurs so as to allow the filter cake residue to be lifted off of the sealed surface by a low backflow pressure from produced reservoir fluids. In an embodiment, complete or essentially complete elimination of flow impairment from the formation through the temporarily sealed surface is achieved.

Various chemicals can be employed as supplemental or added breakers in embodiments, including aqueous soluble sodium, ammonium or potassium persulfates, bromates, hypochlorites, chlorites, peroxides, perchlorates, and the like. Less soluble breakers may contain calcium or magnesium as the counter ion and thereby achieve a delay. The temperature at which these chemicals become reactive varies, with persulfates for example being effective from about 52° C. (125° F.) and higher. At higher temperatures, the persulfates may be too reactive and they may prematurely degrade the filtercake. Encapsulation is a technique to prevent this reaction by physical separation of the reactants. In an embodiment, a high activity breaker such as persulfate can be encapsulated with polyglycolic acid (PGA), polylactic acid (PLA), or other slowly hydrolyzable polyester that forms acid and lowers the pH at the formation conditions, (as described in commonly assigned U.S. Pat. No. 7,166,560 (Still et al.) hereby incorporated by reference in its entirety) to prevent premature loss of fluid control. These acid-forming coatings are not generally considered highly active breakers by themselves in the context of this embodiment, but can provide a self-destructive encapsulation material and assist or facilitate breaking of the viscosifier for gravel pack clean-up when used in conjunction with a high activity breaker encapsulated thereby.

FLCP's used in some embodiments of the invention may also comprise an organoamine compound. Examples of suitable organoamine compounds include, but are not necessarily limited to, tetraethylenepentamine, triethylenetetramine, pentaethylenehexamine, triethanolamine, and the like, or any mixtures thereof. When organoamine compounds are used in fluids of the invention, they may be incorporated in an amount from about 0.01 wt % to about 2.0 wt % based on total liquid phase weight, more particularly, the organoamine compound may be incorporated at an amount from about 0.05 wt % to about 1.0 wt % based on total liquid phase weight.

Embodiments of the invention may use other additives and chemicals that are known to be commonly used in oilfield applications by those skilled in the art. These include, but are not necessarily limited to, materials in addition to those mentioned hereinabove, such as breaker aids, oxygen scavengers, alcohols, antifoaming agents, pH buffers, scale inhibitors, corrosion inhibitors, fluid-loss additives, bactericides, iron control agents, organic solvents, water control agents and cleanup additives, gas components, and the like, depending on the intended use of the fluid, formation conditions and other parameters readily apparent to one of ordinary skill in the art. For example, drilling fluids may further comprise surface active agents, other viscosifiers such as polymers, filtration control agents such as Gilsonite and modified starches, density increasing agents such as powdered barites or hematite or calcium carbonate, or other wellbore fluid additives known to those skilled in the art.

Figure 1:
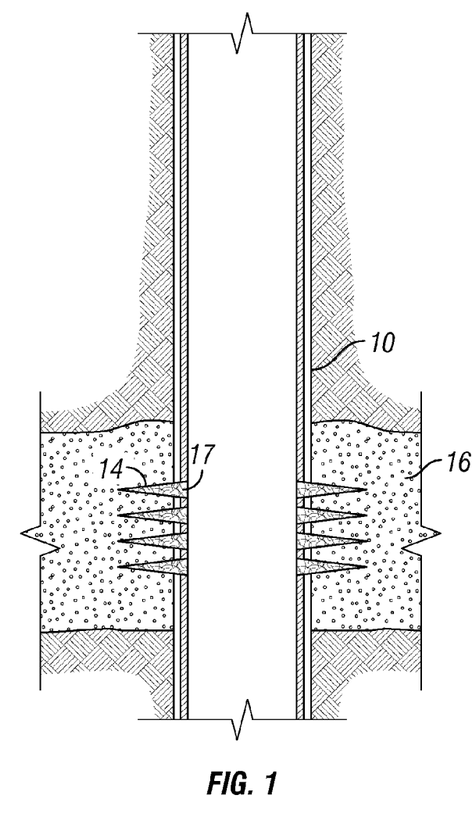
FIG. 1 is a schematic diagram of filtercake deposited in the perforation tunnels of a perforated casing after spotting a fluid loss control pill (FLCP) according to an embodiment of the invention.

In embodiments, the gravel pack method uses the FLCP prior to gravel placement to seal the formation face in the completion zone. The method is applicable to open hole or cased completion zones, for example. Open hole completions in an embodiment include underreamed zones wherein the producing formation is underreamed to enhance productivity. The FLCP described herein is positioned in the wellbore to contact the formation face and overbalanced to force the liquid carrier into the formation and form a filtercake by screening the bridging agent particles at the entrances to the pores or other passages opening at the formation surface. FIG. 1 shows an embodiment of a casing 10 with perforation tunnels 14 in the producing interval 16, wherein a filtercake 17 has been deposited in the perforation tunnels 14 to inhibit fluid entry into the formation during cleanout of perforation debris and/or until gravel packing operations are ready to commence. After the formation is sealed, gravel can be placed in the completion zone using a screen assembly and wash pipe or other appropriate service tool according to any of various gravel placement techniques, such as, for example, reverse circulation of a gravel slurry, crossover, or the like.

Figure 2:
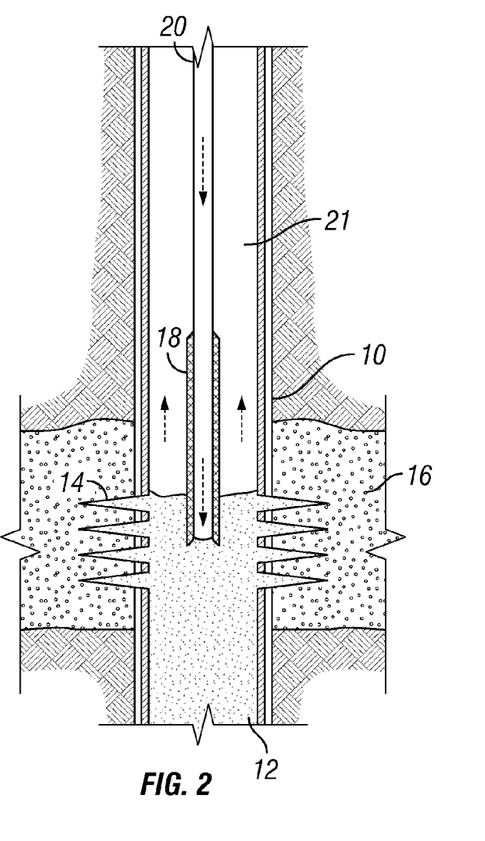
FIG. 2 is a schematic diagram of washdown gravel placement inside a perforated casing according to an embodiment of the invention.

FIG. 2 is a schematic diagram of washdown gravel placement in a perforated casing 10 following the degradation or other removal of any filtercake 17 residue (see FIG. 1) according to an embodiment of the invention. In this embodiment, the FLCP is spotted in the producing interval to inhibit fluid loss via the perforations until the well can be readied for gravel placement. The filtercake is degraded, optionally with a flush to remove any residue, prior to gravel placement. In one embodiment where the intermediate flush step is eliminated, the cost and time of the flush step are saved. Thereafter, the gravel 12 is placed opposite the perforations 14 in the producing interval 16, and then the screen 18 is washed down with gravel-lean fluid via the tubing string 20 to its final position. Fluid is circulated back to the surface via the tubing-casing annulus 22.

Figure 3:
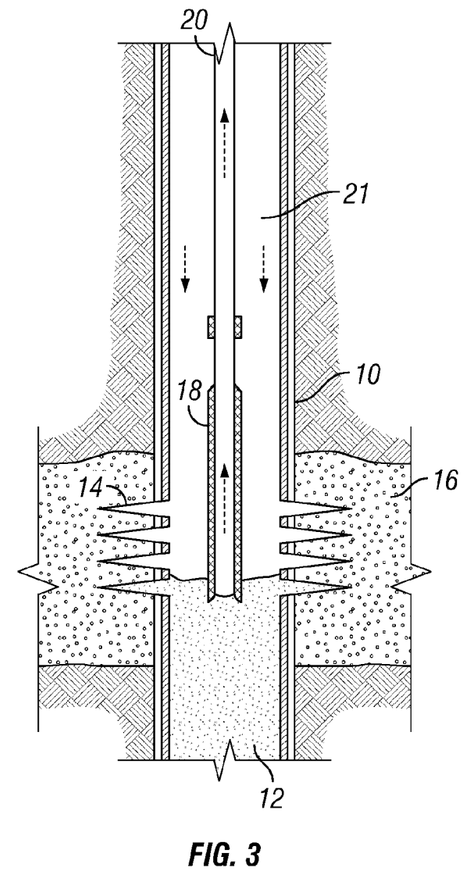
FIG. 3 is a schematic diagram of reverse circulation gravel placement inside a perforated casing according to an embodiment of the invention.

FIG. 3 is a schematic diagram of gravel placement following the degradation or other removal of any filtercake 17 residue (see FIG. 1) using the reverse circulation technique in an embodiment. Following perforation, FLCP placement, filtercake degradation optionally with flushing to remove residue as previously described, the screen 18 is positioned in the producing interval 16. A gravel-laden slurry is circulated down the tubing-casing annulus, and the gravel is sized to screen out on the screen 18 without bridging and plugging the screen openings. The gravel-lean fluid is recirculated to the surface via the tubing 20 until the screen-casing annulus in the production interval is filled.

Figure 4:
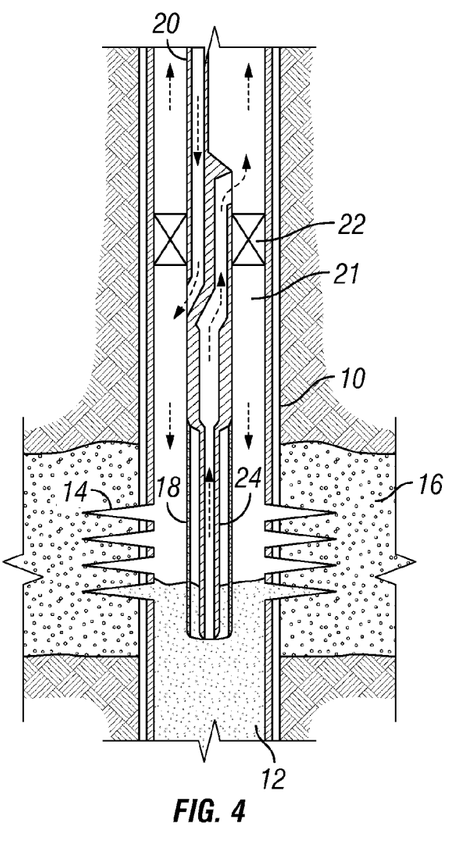
FIG. 4 is a schematic diagram of crossover gravel placement inside a perforated casing according to an embodiment of the invention.

FIG. 4 is a schematic diagram of crossover gravel placement in an embodiment. This is similar to the reverse circulation of FIG. 3 except that a crossover-packing assembly 22 is used to allow the gravel-laden slurry to circulate down the tubing 20 and cross over into the screen-casing annulus. The carrier fluid is returned from inside the screen 18 via the wash pipe 24 and crosses over into the tubing-casing annulus for return to the surface. If desired, fluid can initially enter a distal end of the tubing through a tell-tale section of the screen 18 until gravel is placed in the annulus to cover the lower screen; when the pressure increases, the carrier fluid is squeezed into the formation to pack gravel in the perforation tunnels and/or outside the casing; and then the wash pipe 24 is raised and the carrier fluid circulates through the production section of the screen 18 until sufficient gravel is placed in the annulus.

Figure 5:
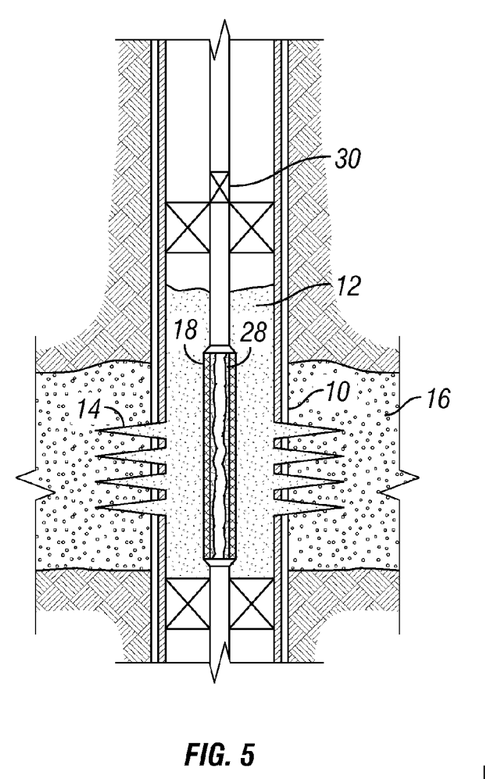
FIG. 5 is a schematic diagram following placement of an FLCP in the screen of the perforated casing of FIGS. 2-4 during service tool removal and/or production tubing assembly with valve isolation according to an embodiment of the invention.
Figure 6:
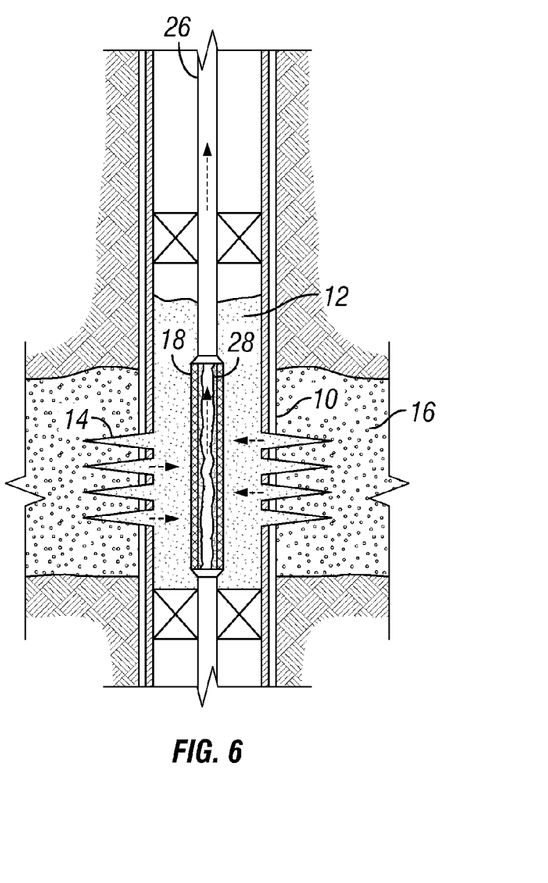
FIG. 6 is a schematic diagram of a gravel pack completion of the perforated casing of FIG. 5 according to an embodiment of the invention.

Following gravel placement, regardless of the gravel placement technique, the wash pipe or other service tool (see FIGS. 2-4) may be removed for production assembly. In an embodiment, an FLCP is spotted in the screen 18 to block the screen openings with a filtercake 28 and inhibit fluid loss during removal of the service tool as illustrated in FIG. 5. The filtercake 28 can be the primary fluid isolation mechanism in the event an isolation valve 30 is not used. If the optional valve 30, which can be a flapper valve in an embodiment, is used to prevent wellbore fluid from entering the completion zone during the trip out and in of the service tool and production tubing, respectively, the filtercake 28 can inhibit fluid entry into the formation 16 in the event the valve 30 fails to isolate. In an embodiment, FIG. 6 illustrates the production tubing 26 following assembly to the screen 18. The filtercake 28 in one embodiment does not substantially degrade until the completion operations are finished and it is desired to produce the well. The well should be kept at least slightly overbalanced in one embodiment to keep the filtercake from being prematurely lifted off the screen. In embodiments, the well can be shut in for a period of time for the polyester bridging agent particles to degrade and/or dissolve, or can be placed in production for the backflow of reservoir fluid to facilitate flushing of any filtercake residue from the screen. In one embodiment where a discrete flush step, e.g., by recirculating a flushing fluid in the wellbore following completion but before production, can be eliminated, the cost and time of the flush step are saved without any significant production flow losses.

EXAMPLES

Figure 7:
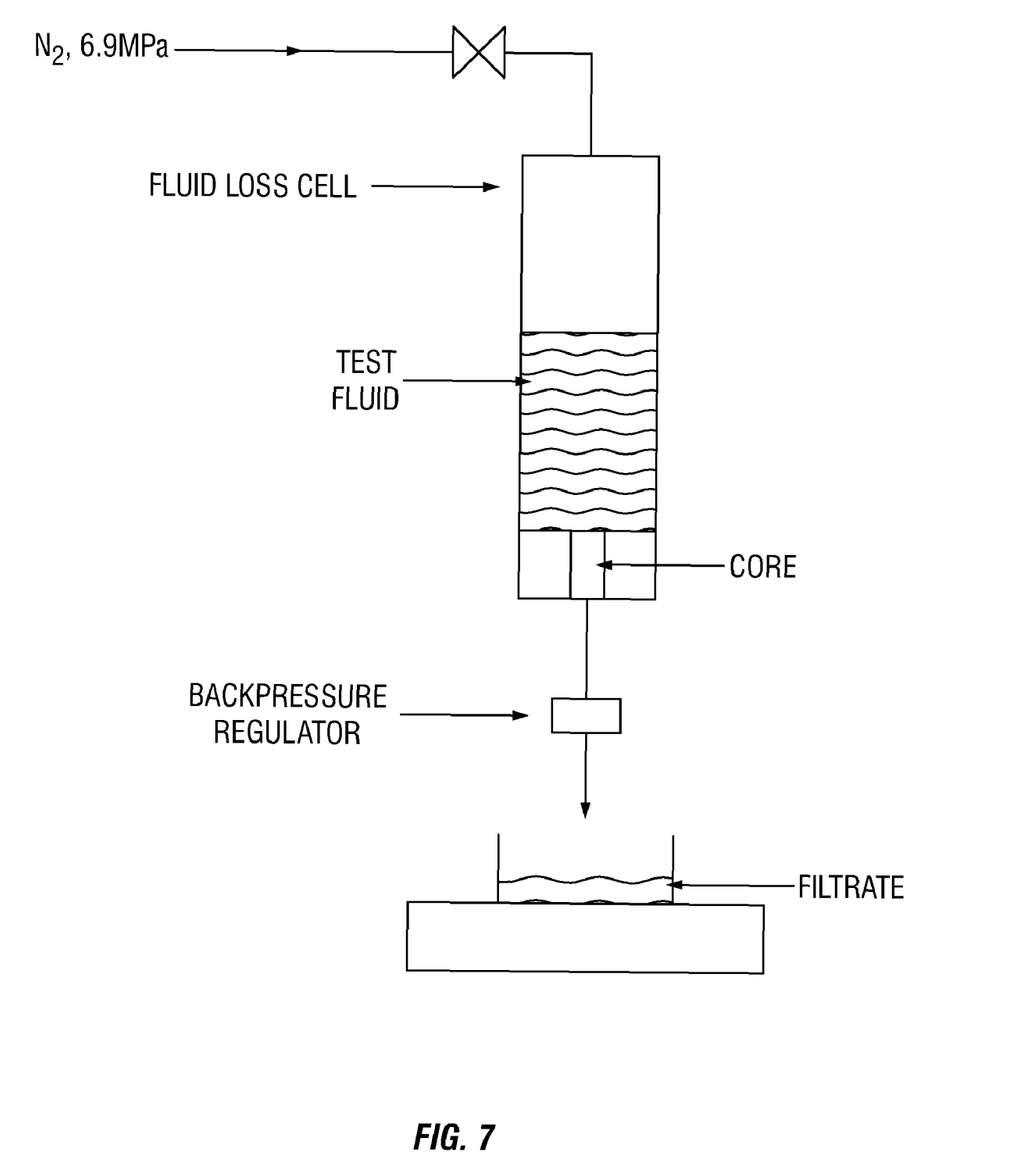
FIG. 7 is a schematic diagram of a static fluid loss cell used in the examples below.

Fluid leak-off to a formation is typically measured using a static or dynamic fluid loss cell. In the examples below, a static fluid loss cell was used to determine the leak-off control with degradable polyesters as fluid loss additives. FIG. 7 shows a schematic of the fluid loss cell. Unless otherwise stated, in each example below, a 0.1 mD Kentucky core measuring 25.4 mm (1 in.) in length by 25.4 mm (1 in.) in diameter) and saturated with 2 weight percent KCl brine was held in place at the bottom of the cell by a mechanical assembly and a confining sleeve. On the top of the core, 80 ml of fluid, with or without the fluid loss additive to be tested, were added. The fluid was prepared with a crosslinked guar at a concentration of 3 g/L (25 ppt). A 6.9 MPa (1000 psi) differential pressure was applied to the fluid in the cell via a pressurized nitrogen line and the leak-off of filtrate was measured using a balance. The cell was maintained at a temperature of 65.5° C. To prevent boiling at high temperatures, a backpressure regulator was connected to the system between the balance and the bottom of the core. The measured filtrate weight in grams during leak-off is plotted as a function of the square root of time, $\min^{0.5}$.

Example 1

Figure 8:
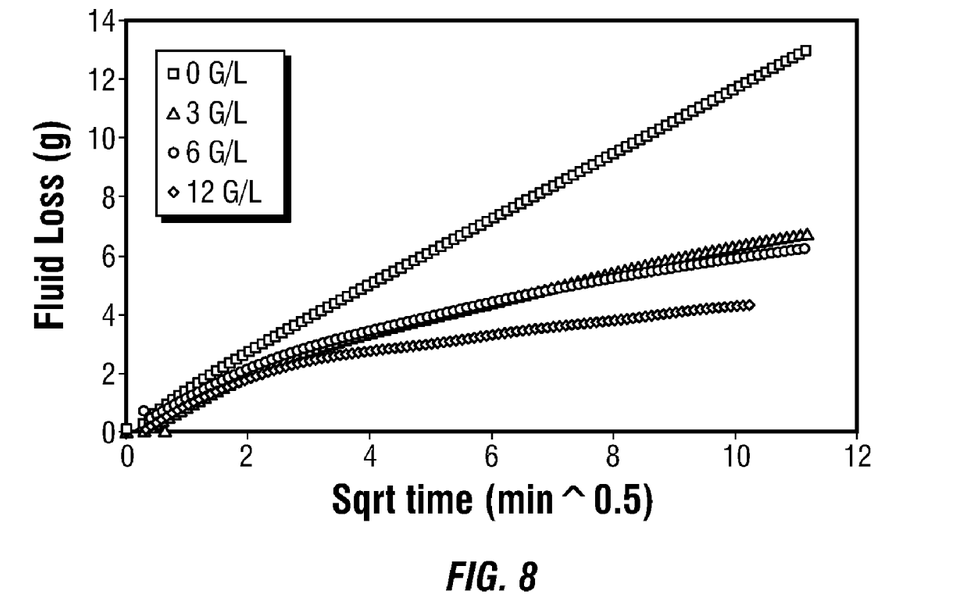
FIG. 8 shows leak-off curves for a guar-viscosified fluid prepared without fluid loss control additives, and with 3, 6 and 12 g/L (25, 50 and 100 ppt) added polylactic acid platelets, tested in the static fluid loss cell of FIG. 7 as described in Example 1 below according to an embodiment of the invention.

A leak-off experiment was conducted using fluid without any added fluid loss additive. The experiment was then repeated by adding 1 mm hexagonal flakes of polylactic acid (PLA) to the guar fluid at concentrations of 3, 6 and 12 g/L (25, 50 and 100 ppt). FIG. 8 shows the fluid loss was reduced depending on the concentration of fluid loss additive in the fluid.

Example 2

Figure 9:
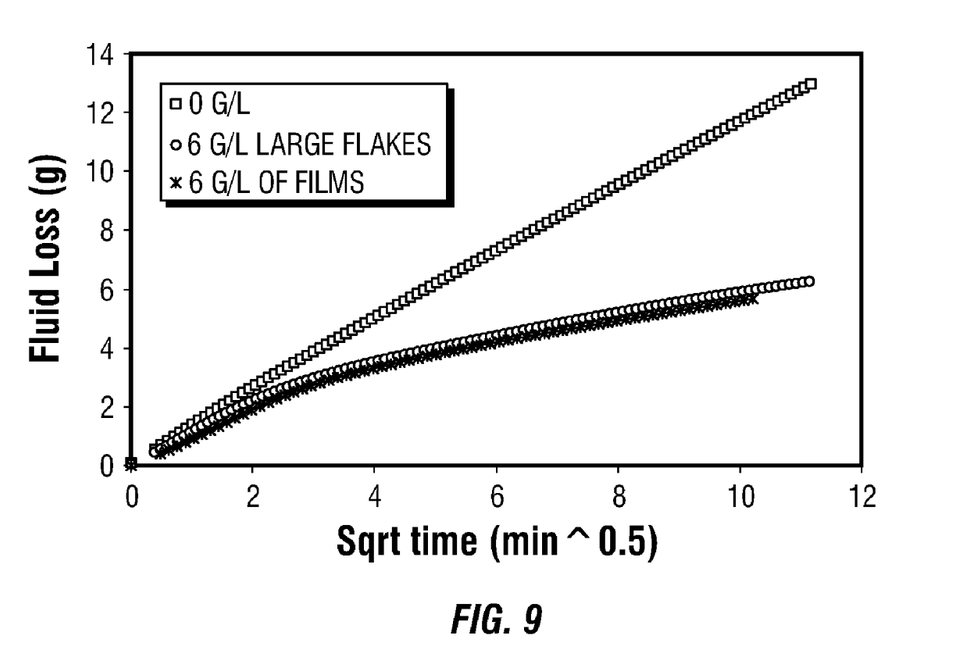
FIG. 9 shows leak-off curves for a guar-viscosified fluid prepared without fluid loss additives, and with 6 g/L (50 ppt) added polylactic acid flakes and films, tested in the static fluid loss cell of FIG. 7 as described in Example 2 below according to an embodiment of the invention.

Another leak-off experiment was conducted using an aqueous fluid with 6 kg/L (50 ppt) flakes as in Example 1, and then with 6 g/L (50 ppt) PLA films measuring 3 mm by 3 mm. The leak-off results are seen in FIG. 9 and show that fluid loss is similarly reduced by both films and flakes added to the fluid.

Example 3

Figure 10:
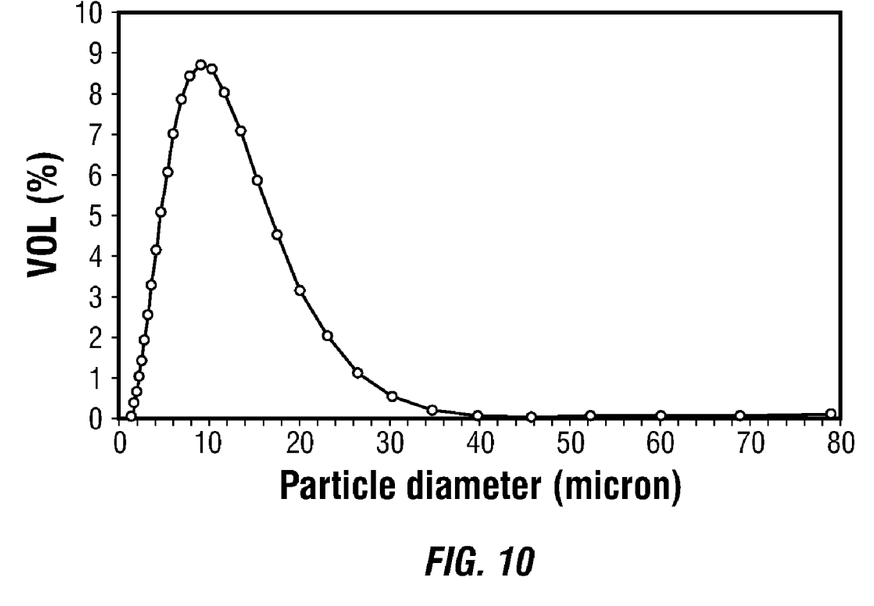
FIG. 10 shows the particle size distribution of polyglycolic acid (PGA) particles used as a fluid loss additive in Example 3 below according to an embodiment of the invention.
Figure 11:
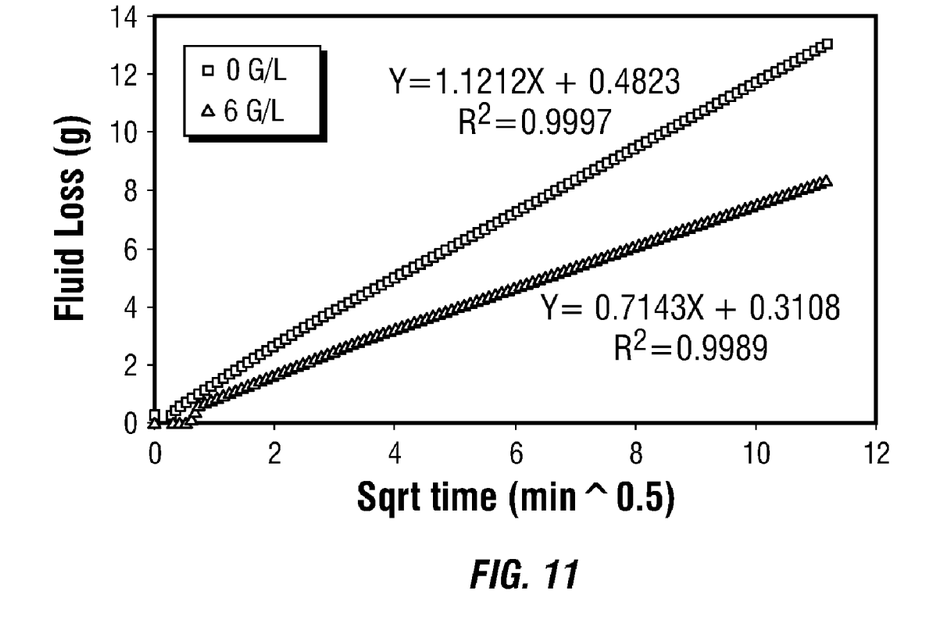
FIG. 11 shows leak-off curves for a guar-viscosified fluid prepared without fluid loss control additives, and with 6 g/L (50 ppt) of the PGA particles of FIG. 10, tested in the static fluid loss cell of FIG. 5 as described in Example 4 below according to an embodiment of the invention.

The procedure of Examples 1 and 2 was repeated using 6 g/L (50 ppt) polyglycolic acid (PGA) particles, with a mean diameter of 15 μm and a particle size distribution shown in FIG. 10. The leak-off results with and without the PGA particles are seen in FIG. 11, and show that addition of PGA particles to the polymer fluid reduced the leak-off of the fluid.

The above examples show that addition of degradable polyesters facilitates the control of the leak-off of the fluid. Different shapes and mixtures of different shapes and sizes can be used to control leak-off. Further, the concentration of the fluid loss additive can be adjusted to increase or reduce the rate of leak-off.

What is claimed is:

1. A method, comprising:
spotting a fluid loss control pill in a well adjacent to a formation to form a filtercake to inhibit fluid entry from the well into the formation, wherein the filtercake comprises plastically deformable polyester particles that are hydrolyzable at a temperature of the formation;
performing a completion operation for the well comprising contacting the filtercake with overbalanced wellbore fluid; and
degrading the filtercake, wherein the polyester particles are hydrolyzed.

2. The method of claim 1 wherein the fluid loss control pill further comprises less than 6 g/L (50 ppt) of hydratable polymer to thicken the pill.

3. The method of claim 2 wherein the fluid loss control pill further comprises a crosslinking agent for the hydratable polymer.

4. The method of claim 3 wherein the hydrolysis of the polyester releases an acid to break the hydratable polymer.

5. The method of claim 1 wherein the fluid loss control pill further comprises borate crosslinked polymer.

6. The method of claim 1 wherein the fluid loss control pill further comprises dissolvable particles mixed with the polyester particles.

7. The method of claim 6 wherein the dissolvable particles comprise acid soluble particles and the hydrolysis of the polyester releases acid to facilitate dissolving the acid soluble particles.

8. The method of claim 1 wherein the fluid loss control pill further comprises calcium carbonate particles.

9. The method of claim 1 wherein the polyester is selected from the group consisting of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

10. The method of claim 1 wherein the fluid loss control pill comprises particles having a mean diameter greater than 15 microns.

11. The method of claim 1 wherein the fluid loss control pill comprises particles having a plurality of size gradings.

12. The method of claim 1 wherein the fluid loss control pill comprises particles having a plurality of types of shapes selected from beads, powders, spheres, ribbons, platelets, fibers, flakes and combinations thereof.

13. The method of claim 1 wherein the fluid loss control pill comprises particles having an aspect ratio greater than 1.

14. The method of claim 1 wherein the formation comprises a compressive strength less than about 6.9 MPa (1000 psi).

15. The method of claim 1 wherein the formation has a permeability greater than about 10 mD.

16. The method of claim 1 wherein the completion operation comprises cleanout.

17. The method of claim 16 wherein the completion operation further comprises gravel packing.

18. The method of claim 16 wherein the filtercake plugs a perforation tunnel.

19. The method of claim 1 wherein the filtercake is formed on a screen after gravel packing.

20. The method of claim 19 wherein the fluid loss control pill comprises particles having a mean diameter greater than one-sixth the width of openings in the screen.

21. The method of claim 19 wherein the completion operation comprises using a valve to isolate the formation from the wellbore fluid.

22. The method of claim 19 wherein the completion operation comprises pulling a wash pipe or service tool from adjacent the screen, assembling production tubing, or a combination thereof.

23. The method of claim 19 comprising backflow flushing of filtercake residue wherein flushing fluid consists essentially of reservoir fluid produced in situ from the formation after the filtercake formation.

24. The method of claim 1 wherein the completion operation comprises tripping a tool string in or out of the well.

25. The method of claim 1 wherein reservoir fluid is produced directly from the formation without intermediate recirculation of a flushing fluid in the well to remove filtercake residue.

26. A method, comprising:
forming a filtercake, wherein the filtercake comprises plastically deformable polyester particles that are hydrolyzable at a temperature of the formation;
contacting the filtercake with overbalanced wellbore fluid; and
degrading the filtercake, wherein the polyester particles are hydrolyzed and wherein the hydrolysis of the polyester releases an acid.

27. A method, comprising:
spotting a fluid loss control pill in a well adjacent to a formation;
forming a filtercake to inhibit fluid entry from the well into the formation; and
contacting the filtercake with overbalanced wellbore fluid
wherein the fluid loss control pill comprises plastically deformable polyester particles that are hydrolyzable at a temperature of the formation,
wherein the polyester particles are hydrolyzed, and
wherein the fluid loss control pill further comprises hydratable polymer to thicken the pill.

* * * * *